Figure 1:
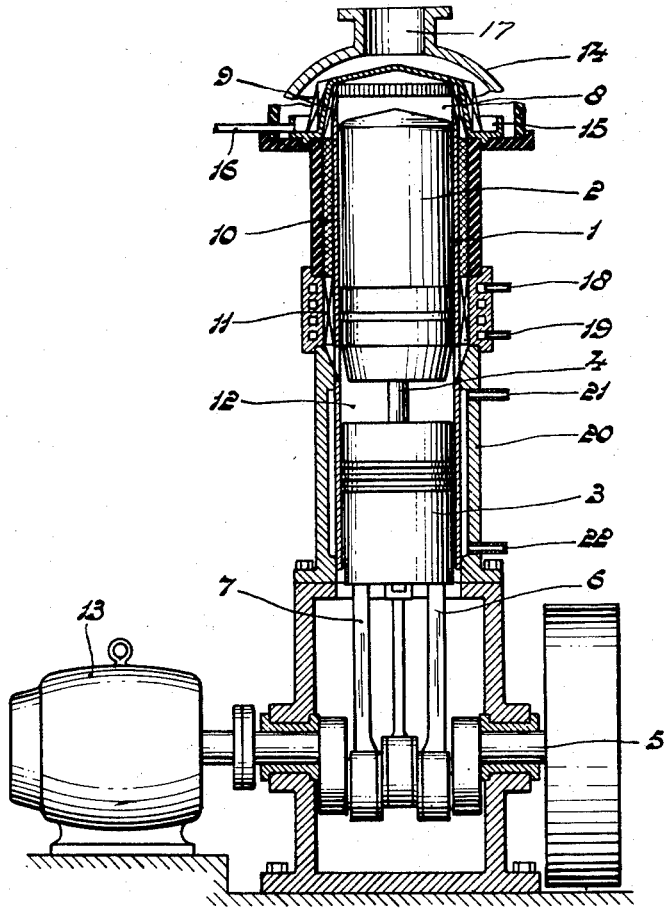

Inventor
Jacob Willem Laurens Köhler
By Fred M Vogel  Agent

United States Patent Office 2,784,570
Patented Mar. 12, 1957

2,784,570

HOT-GAS RECIPROCATING ENGINE FOR REFRIGERATING

Jacob Willem Laurens Köhler, Eindhoven, Netherlands, assignor to Hartford National Bank and Trust Company, Hartford, Conn., as trustee Application March 2, 1953, Serial No. 339,807

Claims priority, application Netherlands March 8, 1952

3 Claims. (Cl. 62—136)

This invention relates to a hot-gas reciprocating engine comprising at least two spaces of variable volume which communicate with each other by way of a heater, a regenerator and a cooler and in which a gas of constant chemical composition traverses a closed thermodynamic cycle, the regenerator surrounding one space of variable volume and the heat exchanger, which provides connection both to the regenerator and to the said space of variable volume, also surrounding this space. The hot-gas reciprocating engine may be adapted to operate as a hot-gas engine, a refrigerator or a heat pump.

According to the invention, the centre lines of the channels in the heat exchanger are at an acute angle with the centre line of the space of variable volume associated with the heat exchanger and the chanels are directed in a direction towards this space.

In this construction those parts of the channels which serve for heat exchange may provide connection to the associated space of variable volume without any appreciable clearance. This avoids the clearance which generally exists in the known hot-gas reciprocating engines and which may exercise some detrimental effect on the action of the engine.

It is sometimes desirable for thermodynamic reasons that a heat exchanger, more particularly the freezer of a cold gas refrigerator, should have a smaller surface area of passage than the regenerator so that when the regenerator and the heat exchanger have the same internal diameter the radial thickness of the heat exchanger is less than that of the regenerator. This results in that the connection of the heat exchanger to the regenerator is slightly abrupt and this adversely affects the working of that part of the regenerator which provides connection thereto. In an alternative embodiment of the invention this disadvantage is obviated, or at least considerably reduced, in that each of the centre lines of the channels intersects the passage area of the regenerator which is arranged adjacent said channels at a point which is spaced apart from the lateral walls of the regenerator by substantially identical distances.

According to a structurally simple embodiment of the invention the heat exchanger comprises two concentric walls, the inner surface of the inner wall circumscribing at least part of the space of variable volume and the said channels being opened out in the boundary surface between the said two walls. The boundary surface is preferably conical.

Figure 2:
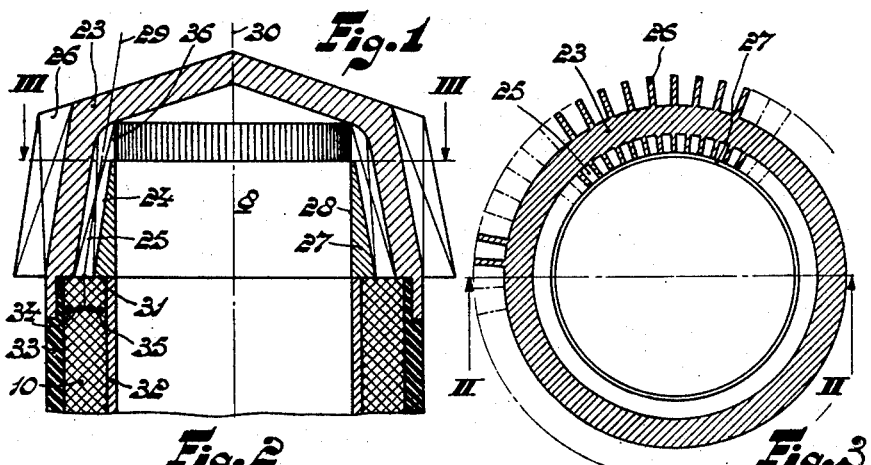
Figure 3:
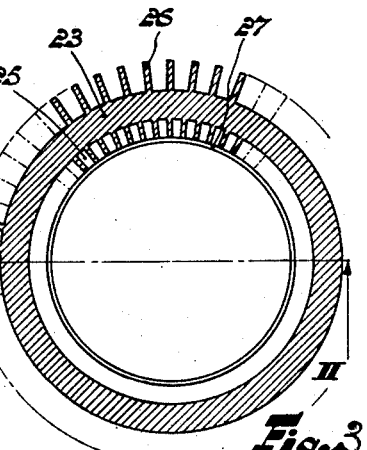

In order that the invention may be readily carried into effect, one example of a hot-gas reciprocating engine according to the invention and of a heat exchanger designed in accordance with the invention will now be described in detail with reference to the accompanying drawing, in which:

Fig. 1 shows a hot-gas reciprocating engine adapted to operate as a cold gas refrigerator, Fig. 2 is an enlarged sectional view of the heat exchanger taken on the line II—II of Fig. 3, and Fig. 3 is an enlarged sectonal view of the heat exchanger taken on the line III—III of Fig. 2.

The cold-gas refrigerator shown in Fig. 1 is of the displacer type and comprises a cylinder 1, in which a displacer 2 and a piston 3 are adapted to reciprocate with a constant phase difference. The displacer 2 is coupled to a crank of the crank shaft 5 by means of a connecting rod system 4 and the piston 3 is coupled to cranks of the same crank shaft by means of connecting rods 6 and 7.

The space 8 above the displacer 2 is the freezing space which by means of a freezer 9, a regenerator 10 and a cooler 11 communicates with the cold space 12 arranged between the displacer and the piston. The refrigerator is driven by an electric motor 13. Thus, a low temperature, for example —190° C., is achieved in the freezing space and in the freezer so that the air contained in the shroud 14 is condensed and is collected in an annular channel 15. The condensed air is discharged through a pipe 16 and the air required to be condensed is supplied through a port 17. The cooler is cooled by means of a cooling agent which is supplied to the cooler at 18 and is discharged therefrom at 19. The running surface of the piston 3 is cooled by means of a water jacket 20, the water being supplied through a pipe 21 and discharged through a pipe 22.

The freezer 9 as referred to hereinbefore will now be described more fully with reference to Figs. 2 and 3 shown on a larger scale. These figures only show a space of variable volume and the associated heat exchangers, the displacer being omitted for the sake of simplicity. Also in this construction, the space of variable volume 8, for example, the freezing space, communicates by way of the freezer 9 and the regenerator 10 with a cooler (not shown) and the cooled space. The freezer 9 is surrounded by a wall 23 the inner surface 24 of which is conical. Recessed in this wall are channels 25 for the freezer which open into the inner surface 24, whereas the outer surface of this wall is provided with fins 26 on which the medium required to be cooled is condensed. Arranged within the wall 23 is a second wall 27 which has a conical outer surface and a cylindrical inner surface 28. The centre line 29 of the channel 25 is at an acute angle with the centre line 30 of the space 8 and the centre line 29 intersects the end surface 31 of the regenerator 10 adjacent the channel 25 at a point which is spaced apart from the regenerator walls 32 and 33 by substantially identical distances. The spacings 34 and 35 are consequently substantially equal to each other. In addition, the channel 25 is inclined in a direction towards the space 8.

Furthermore, in this embodiment, the wall 23 and the channels 25 contained therein are constructed in such a manner that the ends 36 of these channels provide connection to the space of variable volume 8 without any clearance.

Obviously, as an alternative, the channels 25 may be recessed in the inner wall 27, the outer wall 23 exhibiting a smooth surface on its inner side. Although the construction hereinbefore described is used in a displacer machine, it is not intended that it be limited to use with such a machine. It may, however, be used with other types of machines, for example with the so-called double-acting engines.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A hot-gas reciprocating apparatus comprising a cylinder, a piston in said cylinder and forming therewith at least two spaces of variable volume in which a gas of constant chemical composition performs a closed thermodynamic cycle, means for communicating between said two spaces comprising a freezer provided with channels therein, a regenerator and a cooler, a part of said regenerator and said freezer being positioned to surround one of said spaces of variable volume, the center lines of the channels of said freezer being at an acute angle with the center line of said one space of variable volume, and said chanels being inclined in a direction toward said one space.

2. A hot-gas reciprocating apparatus as claimed in claim 1 wherein the center lines of said channels intersect an end surface of said regenerator adjacent said channels at a point substantially equidistant between the inner and outer walls of said regenerator.

3. A hot-gas reciprocating apparatus as claimed in claim 1 wherein said freezer comprises two concentric walls, the inner surface of the inner wall defining at least part of said one of the spaces of variable volume and the outer surface of said inner wall being conical in shape, and at least one of said concentric walls being provided with channels therein, said channels opening out between said two walls into said space.

References Cited in the file of this patent

UNITED STATES PATENTS

| | | |
|---|---|---|
| 2,616,672 | Lambeek | Nov. 4, 1952 |

FOREIGN PATENTS

| | | |
|---|---|---|
| 146,620 | Great Britain | July 12, 1920 |